US012576573B2

(12) United States Patent
Oike et al.

(10) Patent No.:  US 12,576,573 B2
(45) Date of Patent:  Mar. 17, 2026

(54) HOT-RUNNER MOLD AND DEVICE FOR MANUFACTURING RESIN CONTAINER

(71) Applicant: NISSEI ASB MACHINE CO., LTD., Nagano (JP)

(72) Inventors: Toshiteru Oike, Nagano (JP); Daizaburo Takehana, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 216 days.

(21) Appl. No.: 17/916,321

(22) PCT Filed: Apr. 6, 2021

(86) PCT No.: PCT/JP2021/014636
§ 371 (c)(1),
(2) Date: Nov. 30, 2022

(87) PCT Pub. No.: WO2021/206089
PCT Pub. Date: Oct. 14, 2021

(65) Prior Publication Data
US 2023/0219275 A1  Jul. 13, 2023

(30) Foreign Application Priority Data

Apr. 6, 2020  (JP) ................................. 2020-068177
Apr. 17, 2020  (JP) ................................. 2020-074270

(51) Int. Cl.
*B29C 49/06*  (2006.01)
*B29C 45/16*  (2006.01)
(Continued)

(52) U.S. Cl.
CPC .............. *B29C 49/06* (2013.01); *B29C 45/16* (2013.01); *B29C 45/27* (2013.01); *B29C 49/22* (2013.01);
(Continued)

(58) Field of Classification Search
CPC ......... B29C 49/06; B29C 45/16; B29C 45/27; B29C 49/22; B29C 2049/023; B29B 11/08
See application file for complete search history.

(56) References Cited

U.S. PATENT DOCUMENTS 5,540,580 A  7/1996  Takada
2005/0011892 A1  1/2005  Nakajima et al.
(Continued)

FOREIGN PATENT DOCUMENTS

GB  1190351  5/1970
JP  2003-136657 A  5/2003
(Continued)

OTHER PUBLICATIONS

JP2017202716 English translation prepared Aug. 2, 2024 (Year: 2024).*
(Continued)

*Primary Examiner* — Alison L Hindenlang
*Assistant Examiner* — Shibin Liang
(74) *Attorney, Agent, or Firm* — GREENBLUM & BERNSTEIN, P.L.C.

(57) ABSTRACT

A hot runner mold includes a hot runner mold body portion that is fixed to a fixing plate and supplies a molten resin received from a resin inlet to an injection mold, a nozzle receiving portion that is disposed to be inclined with respect to a position orthogonal to the resin inlet of the hot runner mold body portion and is coaxially connected to a nozzle of an injection device that supplies the molten resin, a relay portion that has a resin flow path having a bent portion therein and guides the molten resin from the nozzle receiving portion to the resin inlet, and a regulating portion that is fixed to the fixing plate and regulates movement of the
(Continued)

nozzle receiving portion or the relay portion with respect to the hot runner mold body portion.

5 Claims, 8 Drawing Sheets

(51) Int. Cl.

| | | |
|---|---|---|
| *B29C 45/27* | (2006.01) | |
| *B29C 49/22* | (2006.01) | |
| *B29C 49/02* | (2006.01) | |
| *B29L 31/00* | (2006.01) | |

(52) U.S. Cl.
CPC ................. *B29C 2045/2759* (2013.01); *B29C 2049/023* (2013.01); *B29L 2031/712* (2013.01)

(56) References Cited

U.S. PATENT DOCUMENTS

| | | | | |
|---|---|---|---|---|
| 2008/0279978 A1* | 11/2008 | Babin | ................ | B29C 45/2725 |
| | | | | 425/549 |
| 2010/0200586 A1 | 8/2010 | Furusawa | | |

| | | | | |
|---|---|---|---|---|
| 2012/0328814 A1* | 12/2012 | Atance Orden | .... | B29C 45/1615 |
| | | | | 264/279 |
| 2019/0337218 A1* | 11/2019 | Kawamura | ......... | B29C 49/4823 |

FOREIGN PATENT DOCUMENTS

| | | | | | |
|---|---|---|---|---|---|
| JP | 2011-73179 A | | 4/2011 | | |
| JP | 2011073179 | * | 4/2011 | ............. | B29C 45/13 |
| JP | 5267901 B2 | | 8/2013 | | |
| JP | 2017202716 | * | 1/2017 | ............. | B29C 49/64 |

OTHER PUBLICATIONS

JP2011073179 English translation prepared on Oct. 23, 2024 (Year: 2024).*

Office Action in related Indian patent Application No. 202217062868 dated Feb. 7, 2023.

International Search Report and Written Opinion of the International Searching Authority Issued in International Patent Application No. PCT/JP2021/014636, dated Jun. 15, 2021, along with an English translation thereof.

Office Action dated Jan. 26, 2025 in Chinese family member application No. 202180029772.6, with English language translation thereof.

* cited by examiner

HOT-RUNNER MOLD AND DEVICE FOR MANUFACTURING RESIN CONTAINER

BACKGROUND OF THE INVENTION

Field of the Invention

The present invention relates to a hot runner mold and a manufacturing apparatus for a resin container.

Description of the Related Art

Conventionally, there has been known a resin-made delamination container having a two-layer structure of an inner layer and an outer layer, in which the inner layer is peeled from the outer layer in accordance with discharge of contents thereof. This type of delamination container is also referred to as a delamination bottle or an airless bottle, and is used as, for example, a container of a seasoning liquid such as soy sauce or of a cosmetic liquid of cosmetic products.

At present, in the production of this type of delamination container, an extrusion blow method is generally used, and a stretch blow method is not used as often (see JP 5267901).

For example, from the viewpoint of improving the appearance, dimensional accuracy, physical property strength, and the like of the delamination container and reducing the environmental load of unnecessary materials, applying a blow molding method or a blow molding machine of a one-stage hot parison type (one-stage blow molding method, one-stage blow molding machine) in which an injection molding step to a blow molding step are continuously performed in the production of the delamination container has been considered.

Usually, the one-stage blow molding machine has a configuration of four stations including an injection molding unit, a temperature adjustment unit, a blow molding unit, and a taking-out unit, or three stations obtained by omitting the temperature adjustment step from the above. These three or four molding stations are arranged on a lower base of the molding machine in an approximately regular triangular or square shape. A preform or a container is conveyed to these molding stations by intermittent rotation of a rotating plate including a neck mold.

In the injection molding unit, an injection mold and a hot runner mold are arranged so that an injection device is adjacent thereto. A resin material plasticized and melted by the injection device is injected and introduced into a molding space of the injection mold via the hot runner mold. At this time, the nozzle of the injection device is brought into contact with a sprue (resin introduction port) of the hot runner mold so as to be in close contact with the sprue so as not to cause resin leakage. In addition, the hot runner mold is heated to a high temperature equal to or higher than the melting point of the resin material so that the resin material flowing therein is not solidified.

In addition, in the one-stage blow molding machine, a plurality of preforms are injection-molded at the same time in order to increase the production amount of containers. Therefore, the injection capacity (molten resin amount) per shot is large. In order to secure a large injection capacity, it is necessary to elongate (enlarge) the injection device. If there are three or four molding stations, it is possible to position the injection device in a state of being orthogonal to the front of the hot runner and in such a way that the sprue and a nozzle are aligned. In this case, it is relatively easy to adjust the position of the injection device and adjust the nozzle touch force in consideration of the thermal expansion amount of the hot runner, and the installation area (occupied space) of the entire molding machine is also suppressed.

A one-stage blow molding machine that performs two-layer molding requires two injection molding units, and has a configuration of five or six stations. These stations are arranged on the lower base in an approximately regular pentagonal or regular hexagonal shape. Therefore, when the two injection devices are arranged so as to be orthogonal to the front of the hot runner mold as in the related art, the injection devices extend obliquely from the two surfaces of the regular pentagon or the regular hexagon. As a result, the installation area of the entire molding machine increases, and in some cases, there is a possibility that the size becomes impossible to fit into a transport container. Therefore, a configuration in which the two injection devices are arranged in parallel while being inclined with respect to the front of the hot runner is desirable.

However, in the case of a configuration in which the sprue of the hot runner and the nozzle of the injection device are arranged in an inclined state without being aligned in line, it is difficult to adjust relative positions of members and optimize the nozzle touch force. Therefore, resin leakage is likely to occur between the sprue and the nozzle. In addition, when the nozzle touch force is increased in order to suppress resin leakage, the hot runner mold and an injection cavity mold are pushed by the injection device, so that inclination or misalignment with respect to the lower base occurs, leading to occurrence of uneven thickness of the preform.

SUMMARY OF THE INVENTION

A hot runner mold according to one aspect of the present invention includes a hot runner mold body portion that is fixed to a fixing plate and supplies a molten resin received from a resin inlet to an injection mold, a nozzle receiving portion that is disposed to be inclined with respect to a position orthogonal to the resin inlet of the hot runner mold body portion and is coaxially connected to a nozzle of an injection device that supplies the molten resin, a relay portion that has a resin flow path having a bent portion therein and guides the molten resin from the nozzle receiving portion to the resin inlet, and a regulating portion that is fixed to the fixing plate and regulates movement of the nozzle receiving portion or the relay portion with respect to the hot runner mold body portion.

Further features of the present invention will become apparent from the following description of exemplary embodiments with reference to the attached drawings.

DESCRIPTION OF THE EMBODIMENTS

Figure 1:
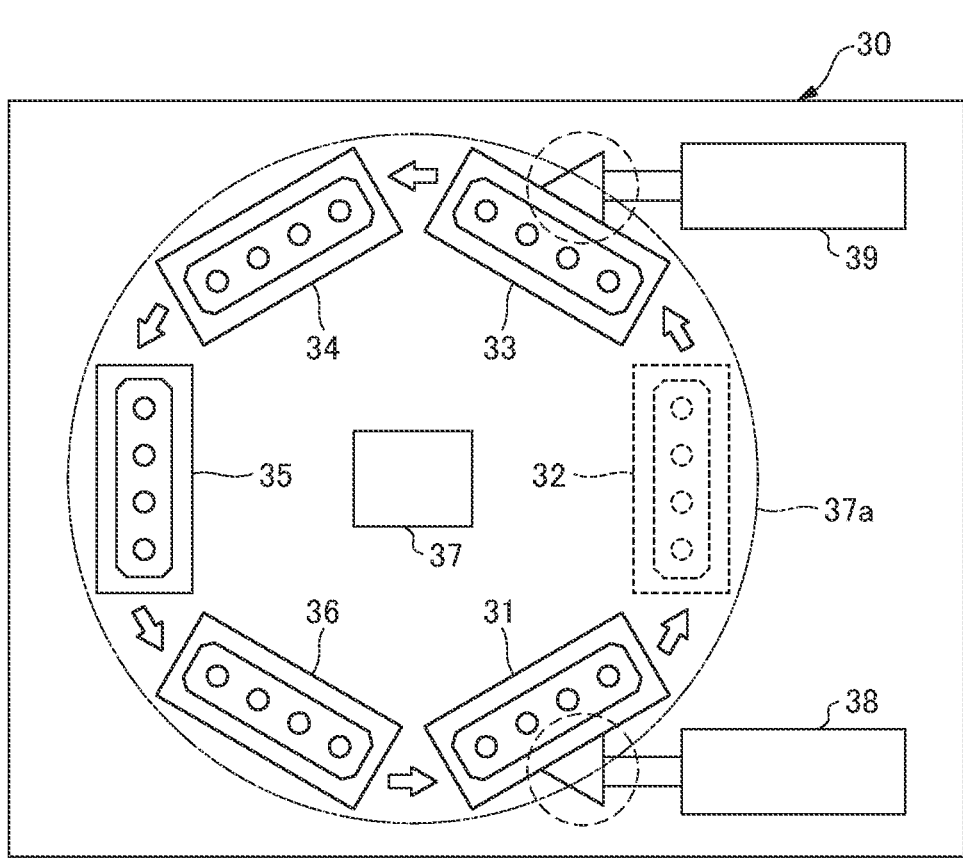
FIG. 1 is a diagram schematically illustrating a configuration of a blow molding apparatus according to the present embodiment.

Hereinafter, an embodiment of the present invention will be described with reference to the drawings.

In the embodiment, for the sake of more understandable description, structures or elements other than the main parts of the present invention will be described in a simplified or omitted manner. In addition, in the drawings, the same elements are denoted by the same reference signs. To be noted, shapes, dimensions, and the like of each element are schematically illustrated in the drawings, and do not indicate actual shapes, dimensions, and the like.

<Description of Manufacturing Apparatus for Delamination Container>

FIG. 1 is a diagram schematically illustrating a configuration of a blow molding apparatus 30 according to the present embodiment. The blow molding apparatus 30 of the present embodiment is an example of a manufacturing apparatus for the delamination container, and employs a hot parison method (also referred to as a one-stage method) in which the delamination container is blow-molded by utilizing residual heat (internal heat amount) from injection molding without cooling a preform 10 to room temperature.

Figure 8:
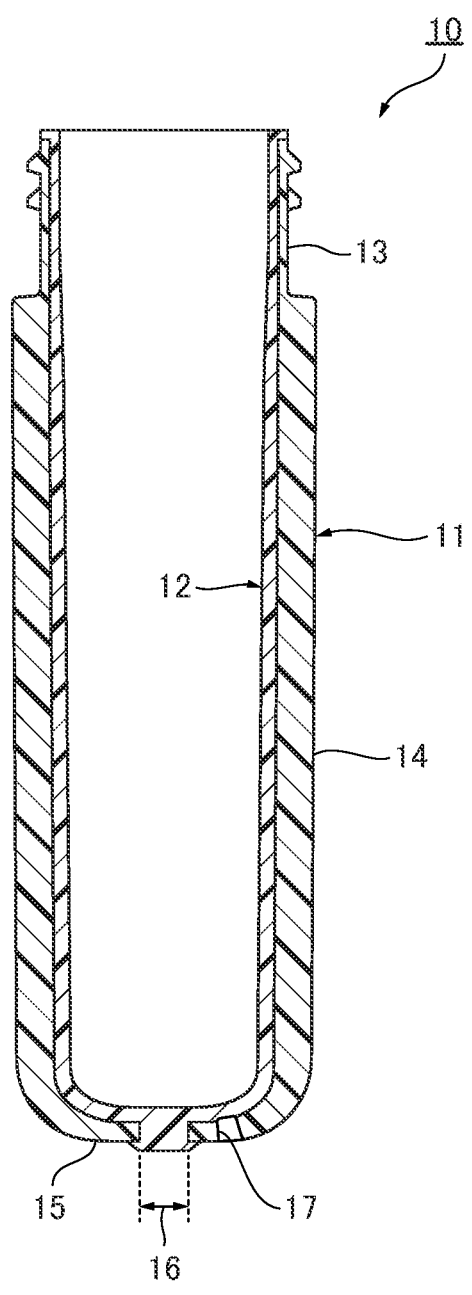
FIG. 8 is a longitudinal section view of a preform of the present embodiment.

The blow molding apparatus 30 of the present embodiment forms the preform 10 having a two-layer structure in which a second layer (inner layer) 12 is formed on the inside of a first layer (outer layer) 11 by two-stage injection molding as illustrated in FIG. 8. The overall shape of the preform 10 is a bottomed cylindrical shape in which one end side is open and the other end side is closed. In addition, the preform 10 includes a body portion 14 formed in a cylindrical shape, a bottom portion 15 that closes the other end side of the body portion 14, and a neck portion 13 formed in an opening on the one end side of the body portion 14. In addition, in the bottom portion 15 of the preform 10, an opening portion 16 penetrating the first layer 11 is formed at the center of the bottom portion of the first layer 11. The opening portion 16 of the first layer 11 is closed from the inside by the second layer 12.

In addition, in the following description, a case where the first layer 11 is injection-molded first and then the second layer 12 is injection-molded on the inside of the first layer 11 will be described. However, in the case of forming the preform 10 having a two-layer structure, the second layer 12 may be injection-molded first, and then the first layer 11 may be injection-molded on the outside of the second layer 12 later.

Referring back to FIG. 1, the blow molding apparatus 30 includes a first injection molding unit 31, a first temperature adjustment unit 32, a second injection molding unit 33, a second temperature adjustment unit 34, a blow molding unit 35, a taking-out unit 36, and a conveyance mechanism 37.

The first injection molding unit 31, the first temperature adjustment unit 32, the second injection molding unit 33, the second temperature adjustment unit 34, the blow molding unit 35, and the taking-out unit 36 are disposed at positions rotated by the same predetermined angle (for example, 60 degrees) about the conveyance mechanism 37. To be noted, the blow molding apparatus 30 may omit the first temperature adjustment unit 32 (in this case, each molding station is disposed at a position rotated by 72 degrees about the conveyance mechanism 37). In addition, in the first injection molding unit 31 and the second injection molding unit 33, an unillustrated core mold elevation mechanism is provided above the conveyance mechanism 37.

(Conveyance Mechanism 37)

The conveyance mechanism 37 includes a rotating plate (transfer plate) 37*a* that rotates about a shaft in a direction perpendicular to the paper surface of FIG. 1. On the rotating plate 37*a*, one or more neck molds 37*b* (not illustrated in FIG. 1) for holding the neck portion 13 of the preform 10 (or the neck portion of the delamination container) are arranged at each predetermined angle. The conveyance mechanism 37 rotates the rotating plate 37*a* to convey the preform 10 (or the delamination container) held by the neck mold 37*b* to the first injection molding unit 31, the first temperature adjustment unit 32, the second injection molding unit 33, the second temperature adjustment unit 34, the blow molding unit 35, and the taking-out unit 36 in this order. To be noted, the conveyance mechanism 37 can also move up and down the rotating plate 37*a*, and also performs operations related to mold closing and mold opening (mold releasing) in the first injection molding unit 31 and the second injection molding unit 33.

(First Injection Molding Unit 31)

The first injection molding unit 31 includes a cavity mold 40, a core mold 41, and a hot runner mold (or a hot runner device) 42, and manufactures the first layer 11 of the preform 10 in cooperation with the neck mold 37*b* conveyed at the time of molding. The cavity mold 40 includes a first cavity mold 40A on the opening side (upper side) and a second cavity mold 40B on the bottom surface side (lower side). A first injection device 38 that supplies a first resin material to the hot runner mold 42 is connected to the first injection molding unit 31. The cavity mold 40 and the hot runner mold 42 are fixed to a machine base of the blow molding apparatus 30 in an integrated state. The core mold 41 is fixed to a core mold elevation mechanism.

Figures 2A, 2B, 2C:
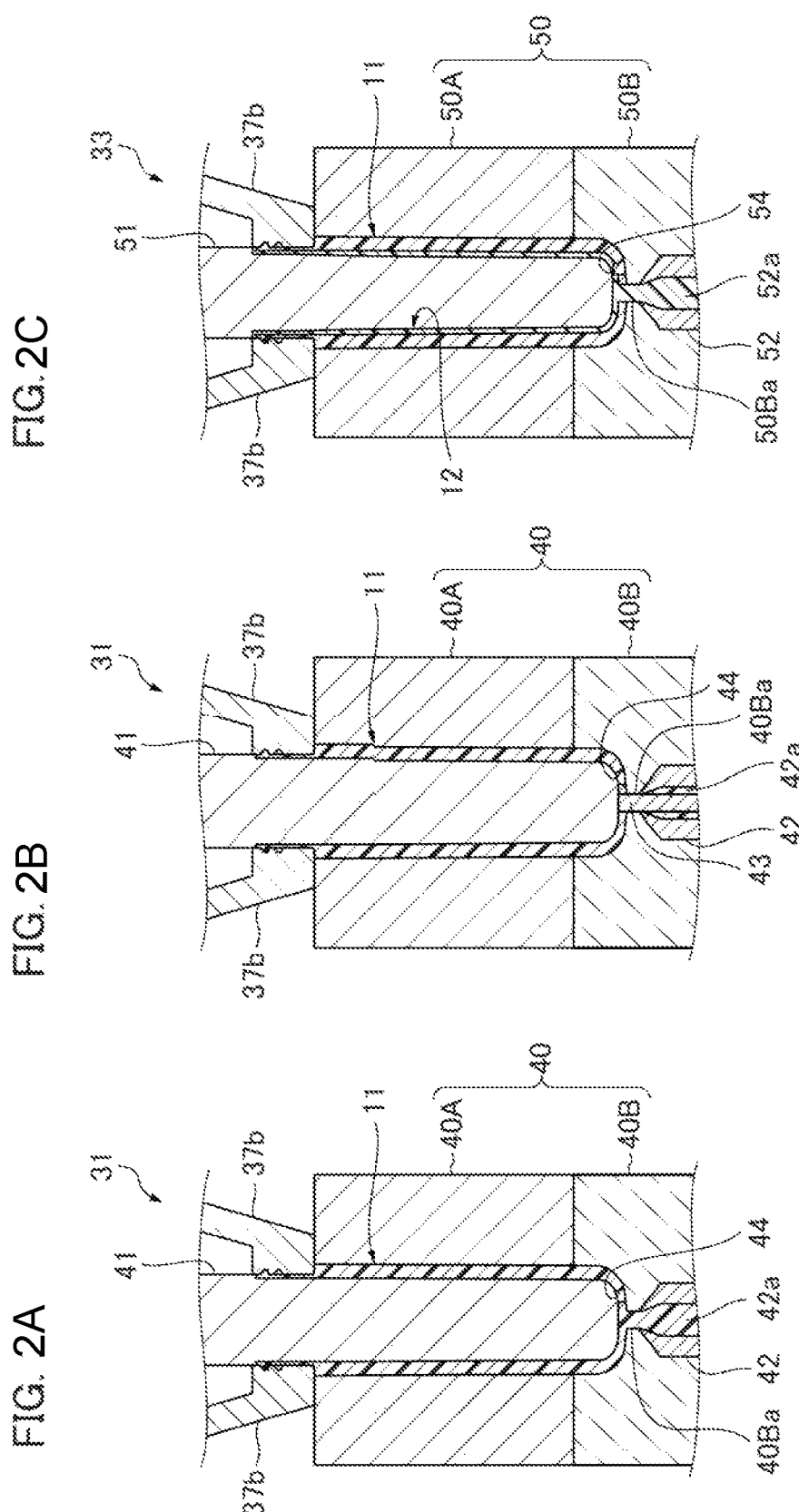
FIGS. 2A to 2C are diagrams illustrating a manufacturing process of the preform of the present embodiment.
Figure 3A:
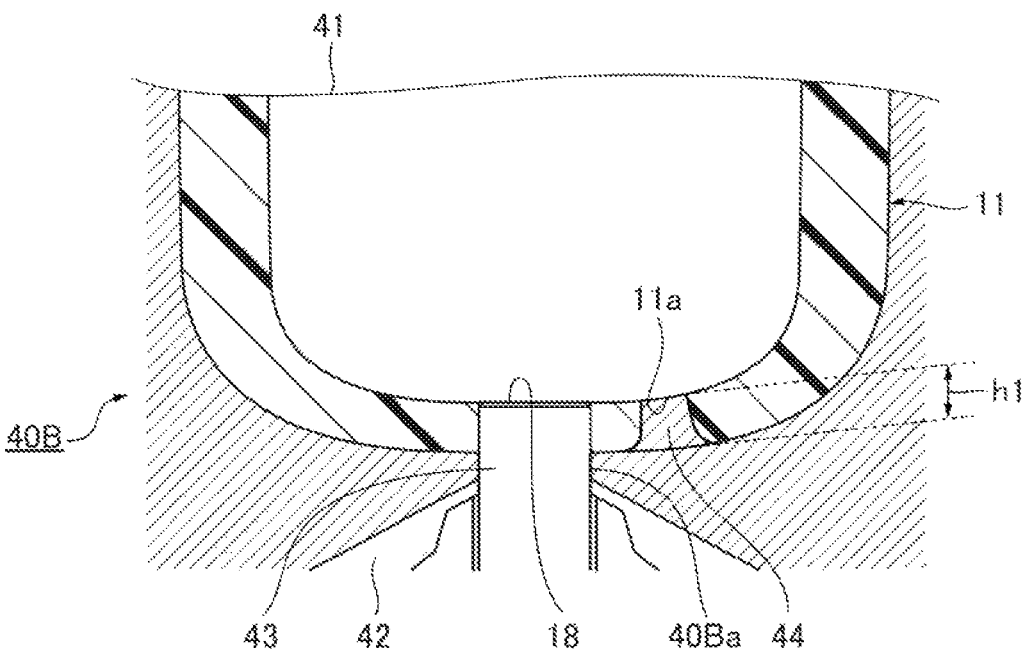
FIG. 3A is a diagram illustrating the vicinity of a bottom portion of a first layer in a first injection molding unit.
Figure 3B:
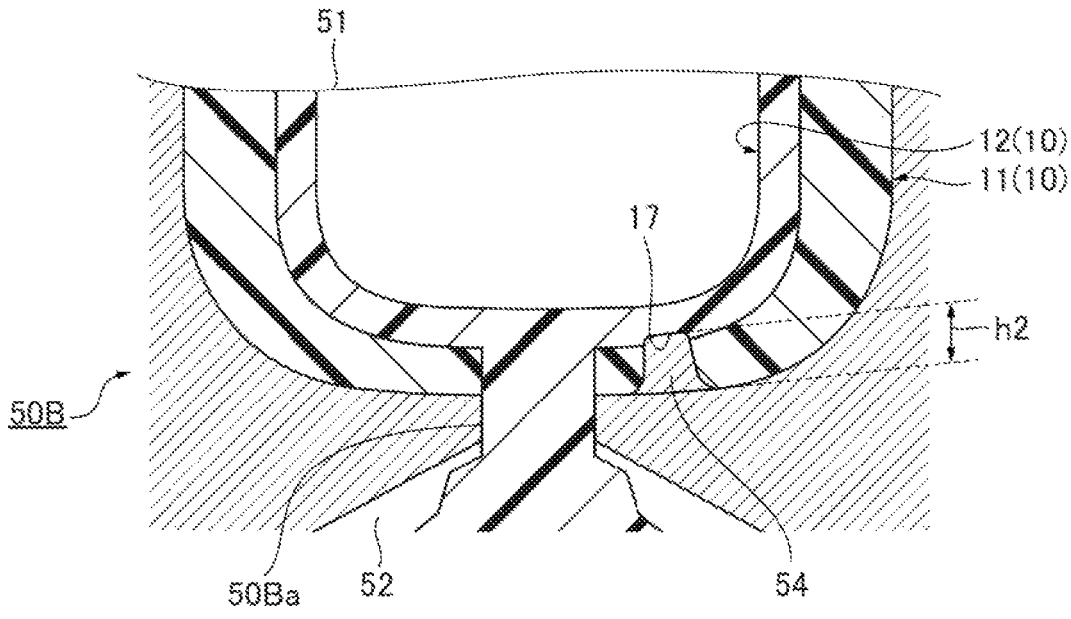
FIG. 3B is a diagram illustrating the vicinity of the bottom portion of the preform in a second injection molding unit.

FIGS. 2A and 2B illustrate the first injection molding unit 31 that molds the first layer 11 of the preform 10 of the present embodiment. FIG. 3B is a diagram illustrating the vicinity of the bottom portion of the first layer 11 in the first injection molding unit 31.

The cavity mold 40 defines the shape of the outer periphery of the first layer 11. The first cavity mold 40A is a mold facing the opening side of the cavity mold 40 (the side in contact with the neck mold 37*b* when the mold is closed), and defines (determines) the shape of the outer periphery of the body portion of the first layer 11. The second cavity mold 40B is a mold facing the bottom surface side (the side in contact with the hot runner mold 42) of the cavity mold 40, and defines the shape of the outer periphery of the bottom portion of the first layer 11. The second cavity mold 40B further includes a gate portion 40Ba that guides the resin material from the hot runner mold 42 to the cavity surface. In addition, the hot runner mold 42 includes a resin supply portion 42*a* that introduces the first resin material plasticized (melted) by the first injection device 38 into the cavity mold 40. The core mold 41 is a mold that defines the shape of the inner peripheral side of the first layer 11, and is inserted into the inner peripheral side of the cavity mold 40 from above. In addition, the neck mold 37*b* conveyed at the time of molding defines the outer shape of the neck portion 13 of the preform 10 (first layer 11).

As illustrated in FIGS. 2A and 2B, in the first injection molding unit 31, the cavity mold 40, the core mold 41, and the neck mold 37*b* of the conveyance mechanism 37 are closed to form a mold space for the first layer 11. Then, the first resin material is poured from the bottom portion of the mold space described above through the hot runner mold 42, and thus the first layer 11 of the preform 10 is manufactured in the first injection molding unit 31.

A first protrusion portion 44 having a columnar shape (alternatively, a tapered columnar shape or a prismatic shape) is provided at a predetermined position on the upper surface side (cavity surface side) of the second cavity mold 40B facing the outer periphery of the bottom portion of the first layer 11. At least one first protrusion portion 44 is disposed at an interval in the radial direction from the center of the bottom portion where the resin supply portion 42a is located. As illustrated in FIG. 3A, a protrusion amount h1 of the first protrusion portion 44 from the cavity standard surface of the second cavity mold 40B (the cavity surface that defines the shape of the lower end side of the outer peripheral surface of the bottom portion of the first layer 11) is substantially the same dimension as the thickness of the first layer 11. Therefore, when the first injection molding unit 31 is closed, the distal end of the first protrusion portion 44 faces the surface of the core mold 41 (disposed in the vicinity of the surface of the core mold 41). As a result, in the injection molding of the first injection molding unit 31, a recess portion 11a such as a circular shape is formed in the first layer 11 at a position corresponding to the recess portion 17 of the preform 10 by the first protrusion 44. The recess portion 11a of the first layer 11 may penetrate the first layer 11, or may have a thin film formed between the core mold 41 and the first protrusion portion 44. To be noted, the recess portion 11a of the first layer 11 formed by the first injection molding unit 31 is also referred to as a first recess portion.

In addition, as illustrated in FIG. 2B, the resin supply portion 42a of the hot runner mold 42 is provided with a valve pin 43 (a bar-shaped member that opens and closes the resin supply portion 42a) that is movable in the axial direction to a position close to the core mold 41. The valve pin 43 is accommodated in the hot runner mold 42 until the mold space is filled with the first resin material, and protrudes to a position closer to the core mold 41 than the opening end on the cavity side of the gate portion 40Ba after the mold space is filled with the first resin material. By such movement of the valve pin 43 during injection molding, a thin film portion 18 in which the thickness of the resin material is smaller than that of the peripheral portion can be formed at the center of the bottom portion of the first layer 11.

In addition, even when the mold of the first injection molding unit 31 is opened, the neck mold 37b of the conveyance mechanism 37 keeps on holding and conveying the first layer 11 of the preform 10 without opening. The number of the preforms 10 simultaneously molded by the first injection molding unit 31 (that is, the number of the delamination containers that can be simultaneously molded by the blow molding apparatus 30) can be appropriately set.

(First Temperature Adjustment Unit 32)

The first temperature adjustment unit 32 includes an unillustrated temperature adjustment mold (a heating pot or a temperature adjustment pot (conditioning pot) that adjusts the temperature of the first layer 11 from the outside, and a heating rod, a temperature adjustment rod (conditioning rod), or an air introduction rod that adjusts the temperature of the first layer 11 from the inside). The first temperature adjustment unit 32 cools (or heats) the first layer 11 in a high-temperature state after injection molding by accommodating the first layer 11 in the temperature adjustment mold maintained at a predetermined temperature. In addition, the first temperature adjustment unit 32 also has a function of adjusting the temperature distribution of the first layer 11 to a predetermined state before being conveyed to the second injection molding unit 33.

(Second Injection Molding Unit 33)

The second injection molding unit 33 includes a cavity mold 50, a core mold 51, and a hot runner mold 52, and performs injection molding of the second layer 12 on the inner peripheral side of the first layer 11 in cooperation with the neck mold 37b conveyed at the time of molding. The cavity mold 50 includes a first cavity mold 50A on the opening side (upper side) and a second cavity mold 50B on the bottom surface side (lower side). A second injection device 39 that supplies a second resin material to the hot runner mold 52 is connected to the second injection molding unit 33.

FIG. 2C illustrates the second injection molding unit 33 that molds the second layer 12 of the preform 10. FIG. 3B is a diagram illustrating the vicinity of the bottom portion of the preform 10 in the second injection molding unit 33.

The cavity mold 50 is a mold that accommodates the first layer 11. The first cavity mold 50A is a mold facing the opening side of the cavity mold 50, and accommodates the body portion of the first layer 11. The second cavity mold 50B is a mold facing the bottom surface side of the cavity mold 50, and accommodates the bottom portion of the first layer 11. The second cavity mold 50B further includes a gate portion 50Ba that guides the resin material from the hot runner mold 52 to the cavity surface. In addition, the hot runner mold 52 includes a resin supply portion 52a that introduces the second resin material plasticized (melted) by the second injection device 39. The core mold 51 is a mold that defines the shape of the inner peripheral side of the second layer 12, and is inserted into the inner peripheral side of the cavity mold 50 from above. In addition, the neck mold 37b conveyed at the time of molding defines an upper end surface (top surface) of the neck portion 13 of the preform 10 (second layer 12). Note that the hot runner mold 52 may have a structure including a valve pin like the hot runner mold 42.

As illustrated in FIG. 2C, the second injection molding unit 33 accommodates the first layer 11 of the preform 10 injection-molded by the first injection molding unit 31. In a state where the second injection molding unit 33 is closed, a mold space is formed between the inner peripheral side of the first layer 11 and the surface of the core mold 51. In the second injection molding unit 33, the second resin material is poured from the bottom portion of the mold space described above through the hot runner mold 52 to form the preform 10 in which the second layer 12 is formed on the inner peripheral side of the first layer 11.

In addition, on the upper surface side (cavity surface side) of the second cavity mold 50B facing the outer periphery of the bottom portion of the first layer 11, a second protrusion portion 54 having a columnar shape or the like corresponding to the shape of the recess portion 17 of the preform 10 is provided at a predetermined position corresponding to the first protrusion portion 44 of the first injection molding unit 31. The second protrusion portion 54 is inserted into the recess portion 11a of the first layer 11 when the first layer 11 is accommodated in the second injection molding unit 33. As described above, the basic configuration of the protrusion and the like in the second cavity mold 50B is substantially similar to that of the second cavity mold 40B of the first injection molding unit 31.

Here, as illustrated in FIG. 3B, a protrusion amount h2 of the second protrusion portion 54 from the cavity standard surface of the second cavity mold 50B (the cavity surface in contact with a lower end side region of the outer peripheral surface of the bottom portion of the first layer 11) is a larger dimension than the thickness of the first layer 11. That is, the protrusion amount h2 of the second protrusion portion 54 is larger than the protrusion amount h1 of the first protrusion portion 44 (h2>h1). Therefore, when the second injection molding unit 33 is closed, the distal end of the second protrusion portion 54 penetrates the recess portion 11a of the first layer 11 and protrudes to the inner peripheral side of the first layer 11. By providing the second protrusion portion 54 in the second cavity mold 50B of the second injection molding unit 33, the recess portion 17 can be formed in the bottom portion 15 of the preform 10.

In addition, the protrusion amount h2 of the second protrusion portion 54 is set to be smaller than the thickness of the preform 10. That is, in the injection molding in the second injection molding unit 33, since the second resin material flows into a space between the core mold 51 and the second protrusion portion 54, a hole penetrating the second layer 12 is not formed by the second protrusion portion 54.

(Second Temperature Adjustment Unit 34)

The second temperature adjustment unit 34 includes an unillustrated temperature adjustment mold unit (a heating pot or a temperature adjustment pot (conditioning pot) that adjusts the temperature of the preform 10 from the outside, and a heating rod, a temperature adjustment rod (conditioning rod), or an air introduction rod that adjusts the temperature of the preform 10 from the inside). The second temperature adjustment unit 34 accommodates the preform 10 conveyed from the second injection molding unit 33 in a mold unit maintained at a predetermined temperature to equalize temperature and remove temperature unevenness, and adjusts the temperature of the preform 10 to a temperature suitable for final blowing (for example, about 90° C. to 105° C.). In addition, the second temperature adjustment unit 34 also has a function of cooling the preform 10 in a high temperature state after injection molding.

(Blow Molding Unit 35)

The blow molding unit 35 performs blow molding on the preform 10 whose temperature has been adjusted by the second temperature adjustment unit 34 to manufacture the delamination container.

The blow molding unit 35 includes a blow cavity mold which is a pair of split molds corresponding to the shape of the delamination container, a bottom mold, a stretching rod, and an air introduction member (all not illustrated). The blow molding unit 35 blow-molds the preform 10 while stretching the preform 10. As a result, the preform 10 is shaped into the shape of the blow cavity mold, and the delamination container can be manufactured.

(Taking-Out Unit 36)

The taking-out unit 36 is configured to release the neck portion of the delamination container manufactured by the blow molding unit 35 from the neck mold 37b and take out the delamination container to the outside of the blow molding apparatus 30.

(Arrangement of Injection Devices and Hot Runner Mold)

In addition, as illustrated in FIG. 1, in the blow molding apparatus 30, the first injection device 38 and the second injection device 39 are aligned in parallel so as to extend in the longitudinal direction of the apparatus (left-right direction in FIG. 1). In this case, the projected area of the blow molding apparatus 30 in planar view is reduced, and thus the size of the blow molding apparatus 30 can be reduced. To be noted, in the case of the configuration of FIG. 1, the first injection device 38 and the second injection device 39 are connected obliquely with respect to the device front of the injection molding units respectively corresponding thereto.

Incidentally, at the time of injection molding, the hot runner mold of the injection molding unit is heated to a predetermined temperature (for example, 255° C.) due to the inflow of the molten resin, and thermal expansion occurs. The amount of this thermal expansion varies depending on the temperature of the hot runner mold.

For example, when the injection device is disposed in a direction orthogonal to the device front of the injection molding unit (the front of the hot runner mold in which the sprue is disposed), the nozzle (injection nozzle) of the injection device is disposed to face the expansion direction of the hot runner mold. That is, according to the above arrangement, the direction in which a nozzle receiving portion of the hot runner mold moves due to thermal expansion and the force generated in the nozzle of the injection device due to the injection of the molten resin, holding of the nozzle, and the like (the force exerted by the nozzle of the injection device on the nozzle receiving portion) act substantially coaxially. Therefore, in the case of the above arrangement, it is relatively easy to align the nozzle receiver of the hot runner mold with the nozzle of the injection device and adjust the force for connection, and leakage of the molten resin at the connection portion between the hot runner mold and the injection device is less likely to occur.

However, as indicated by a circle of a broken line in FIG. 1, when the injection device is connected obliquely with respect to the front of the hot runner mold of the injection molding unit, the nozzle of the injection device is inclined with respect to the expansion direction of the hot runner mold. That is, the direction in which a nozzle receiving portion of the hot runner mold moves due to thermal expansion and the force generated in the nozzle of the injection device due to the injection of the molten resin, holding of the nozzle, and the like (the force exerted by the nozzle of the injection device on the nozzle receiving portion) do not act coaxially. Therefore, in the case of the configuration of FIG. 1, it is difficult to perform alignment (centering) of the nozzle receiving portion of the hot runner mold and the nozzle of the injection device and adjust the force (nozzle touch force) for connecting the nozzle to the nozzle receiving portion, and leakage of molten resin at the connection portion between the hot runner mold and the injection device is likely to occur.

Figure 4:
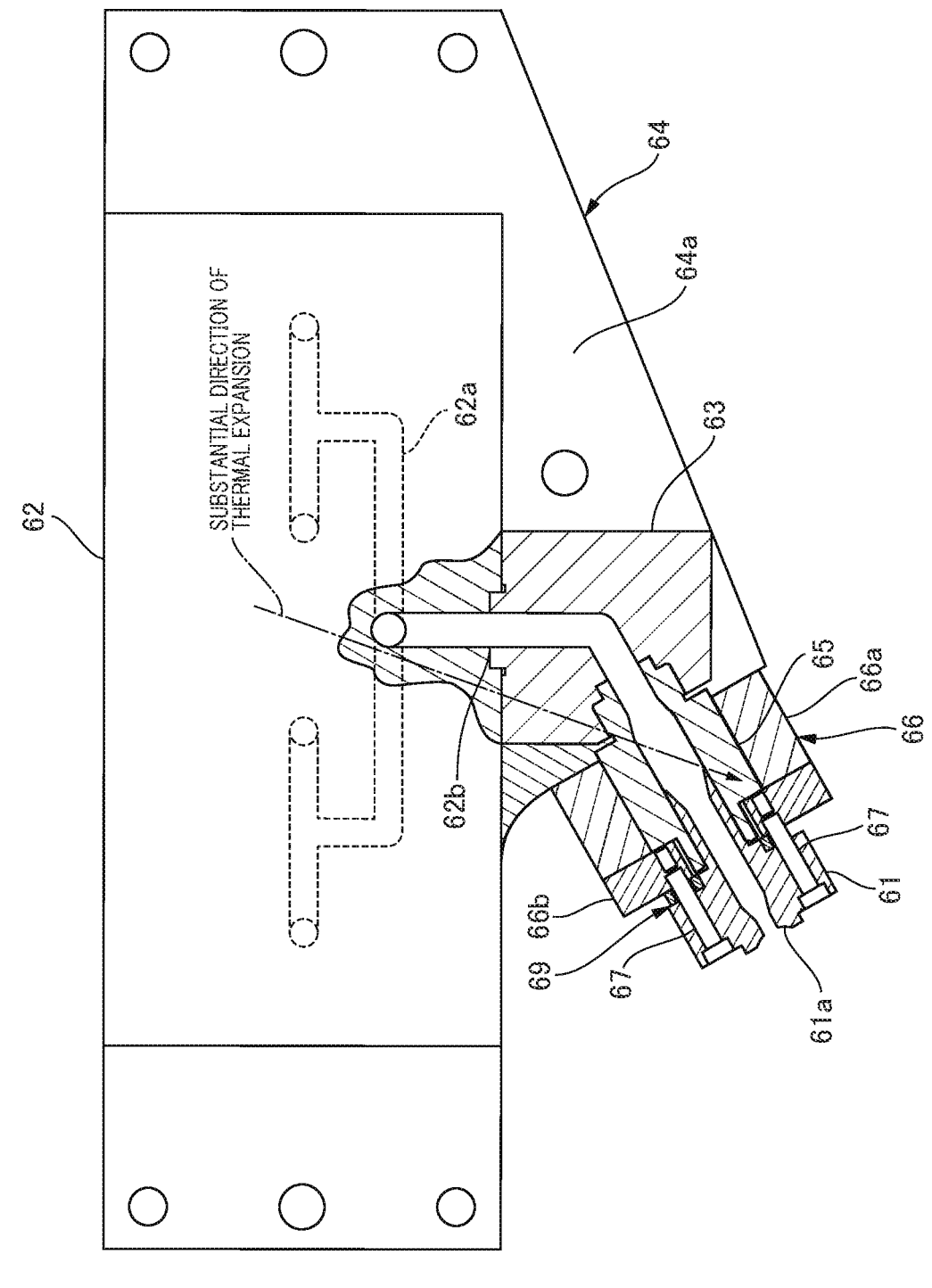
FIG. 4 is a diagram illustrating a configuration example of a connection portion between a hot runner mold and an injection device.

FIG. 4 is a diagram illustrating a configuration example of the hot runner mold for suppressing resin leakage at the connection portion described above. The configuration of the hot runner mold illustrated in FIG. 4 is common to the first injection molding unit and the second injection molding unit.

The hot runner mold (or hot runner device) 42 (52) includes at least a hot runner body portion (manifold portion) 62, a relay portion (relay block portion) 63, a sprue portion (sprue bush portion) 69, and a hot runner fixing plate 64. The sprue portion 69 includes a first mouthpiece portion (first cap portion, first opening adaptor portion) 61 and a second mouthpiece portion (second cap portion, second opening adaptor portion) 65. The hot runner mold 42 (52) further includes a bracket (coupling member, support member) 66 and a coupling pin 67.

A heating member (not illustrated) such as a rod heater or a band heater is provided in the hot runner body portion 62, the relay portion 63, and the sprue portion 69. The hot runner body portion 62 is fixed to the hot runner fixing plate 64 via a heat insulating member (not illustrated). In addition, in the hot runner fixing plate 64, a plurality of pressure receiving plates (not illustrated) that abut the lower surface of the cavity mold 40 (50) are erected in a manner where a predetermined gap is formed between the hot runner body portion 62 and the pressure receiving plates surrounds the hot runner body 62.

The sprue portion 69 (more specifically, first mouthpiece portion 61) has a nozzle receiving portion 61a for receiving a nozzle (not illustrated) of the injection device 38 (39) on one end side, and the other end side is a member to be inserted into the second mouthpiece portion 65. In addition, the first mouthpiece portion 61 has a plurality of insertion portions for coupling pins 67 disposed on the outer periphery of the nozzle receiving portion 61a. Note that the first mouthpiece portion 61 and the second mouthpiece portion 65 are disposed to be inclined from a position orthogonal to a resin inlet 62b of the hot runner mold body portion 62, and are connected substantially coaxially to the nozzle of the injection device.

The hot runner body portion 62 has a branch flow path (first runner portion) 62a for distributing and supplying a molten resin to each cavity of the cavity mold 40 (50) of the injection molding unit. The branch flow path is formed from the side surface to the inside and the upper surface of the hot runner body portion 62, and a hot runner nozzle (not illustrated) communicating with each cavity is provided on the upper surface of the hot runner body portion 62.

The relay portion 63 is a block that connects the resin inlet 62b of the hot runner body portion 62 to the sprue portion 69 (more specifically, the second mouthpiece portion 65). The relay portion 63 has a resin flow path (second runner portion) having a bent portion therein, and has a function of inclining the flow path connected to the second mouthpiece portion 65 with respect to the resin inlet of the hot runner body portion 62. The relay portion 63 is fixed to the front side of the hot runner body portion 62 (the side on which a protrusion portion 64a that will be described later is provided) such that the resin flow path thereof communicates with the resin inlet 62b and the branch flow path 62a. The relay portion 63 is, for example, a substantially columnar member including a first cutout portion. The first cutout portion is formed by obliquely cutting a side surface from an end surface (circular surface) of the columnar member on a side not in contact with the hot runner body portion 62. The sprue portion 69 (second mouthpiece portion 65) is connected to the first cutout portion.

In addition, the hot runner fixing plate 64 for fixing at least the hot runner body portion 62 is attached to the outside (lower side) of the hot runner body portion 62 and the relay portion 63. The hot runner fixing plate 64 has a protrusion portion 64a having a substantially triangular shape in planar view on the attachment side of the relay portion 63. The protrusion portion 64a is set to have a size that encloses the relay portion 63 in planar view, and the bracket 66 is attached to one surface of the protrusion portion 64a. Note that the relay portion 63 may also be fixed to the hot runner fixing plate 64 as necessary.

The second mouthpiece portion 65 is a member into one end side of which the other end of the first mouthpiece portion 61 is inserted, and the other end side of which is connected (fixed) to the flow path of relay portion 63.

The bracket 66 is connected to the protrusion portion 64a of the hot runner fixing plate 64 and covers a connection portion between the relay portion 63 and the second mouthpiece portion 65. The bracket 66 includes a rectangular (block-shaped) main body portion 66a that faces the outer peripheral surface (or lower side) of the second mouthpiece portion 65, and a rectangular (flat-plate-shaped) coupling portion 66b that is coupled to one end side of the first mouthpiece portion 61. A hole for receiving the coupling pin 67 is formed in the coupling portion 66b of the bracket 66. In addition, the coupling portion 66b of the bracket 66 is provided with a through hole having a predetermined size, and the second mouthpiece is inserted in a state where there is a gap with the inner surface of the through hole. This gap allows positional fluctuation of the second mouthpiece portion 65 caused by thermal expansion.

Here, the first mouthpiece portion 61 is loosely fitted to the coupling portion 66b of the bracket 66 via the coupling pins 67, and is configured to allow inclination in the axial direction with respect to the bracket 66 and the second mouthpiece portion 65. Therefore, even when there is deformation caused by thermal expansion of the hot runner mold, the connection state between the nozzle of the injection device and the hot runner mold can be appropriately maintained by the relative movement of the first mouthpiece portion 61 and the second mouthpiece portion 65 (more specifically, as a result of the first mouthpiece portion 61 shifting in position in a predetermined direction between the second mouthpiece portion 65 and the nozzle), and leakage of the molten resin can be suppressed. That is, the first mouthpiece portion 61, the second mouthpiece portion 65, and the bracket 66 function as a regulating portion that regulates inappropriate movement of the nozzle receiving portion 61a.

In addition, according to the configuration of FIG. 4, an excessive nozzle touch force is not required for suppressing resin leakage. Therefore, when the hot runner mold and the injection cavity mold are pressed by the injection device, inclination or misalignment with respect to the lower base is suppressed, and uneven thickness of the preform is less likely to occur.

Figure 5:
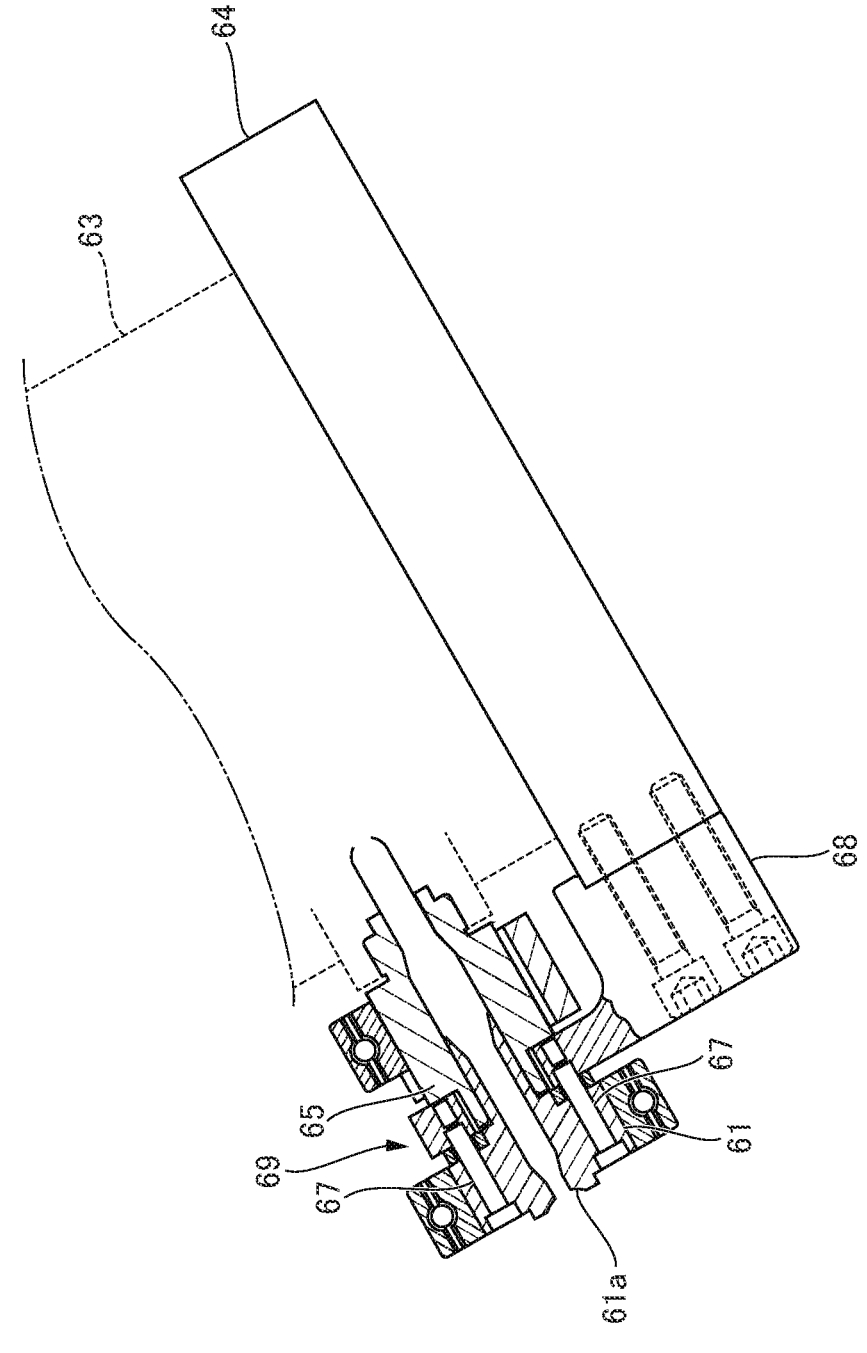
FIG. 5 is a diagram illustrating a configuration of FIG. 4 from the side.

FIG. 5 is a diagram illustrating a configuration of the hot runner mold 42 (52) of FIG. 4 from the side. In the configuration of FIG. 5, the bracket 66 having an L shape in side view is attached to the hot runner fixing plate 64. The second mouthpiece portion 65 is sandwiched and held between the coupling portion (coupling plate) 66a of the bracket 66 and the relay portion 63, and the first mouthpiece portion 61 is connected to the second mouthpiece portion 65 while being loosely fitted to the coupling portion 66b of the bracket 66 via the coupling pins 67.

Figure 6:
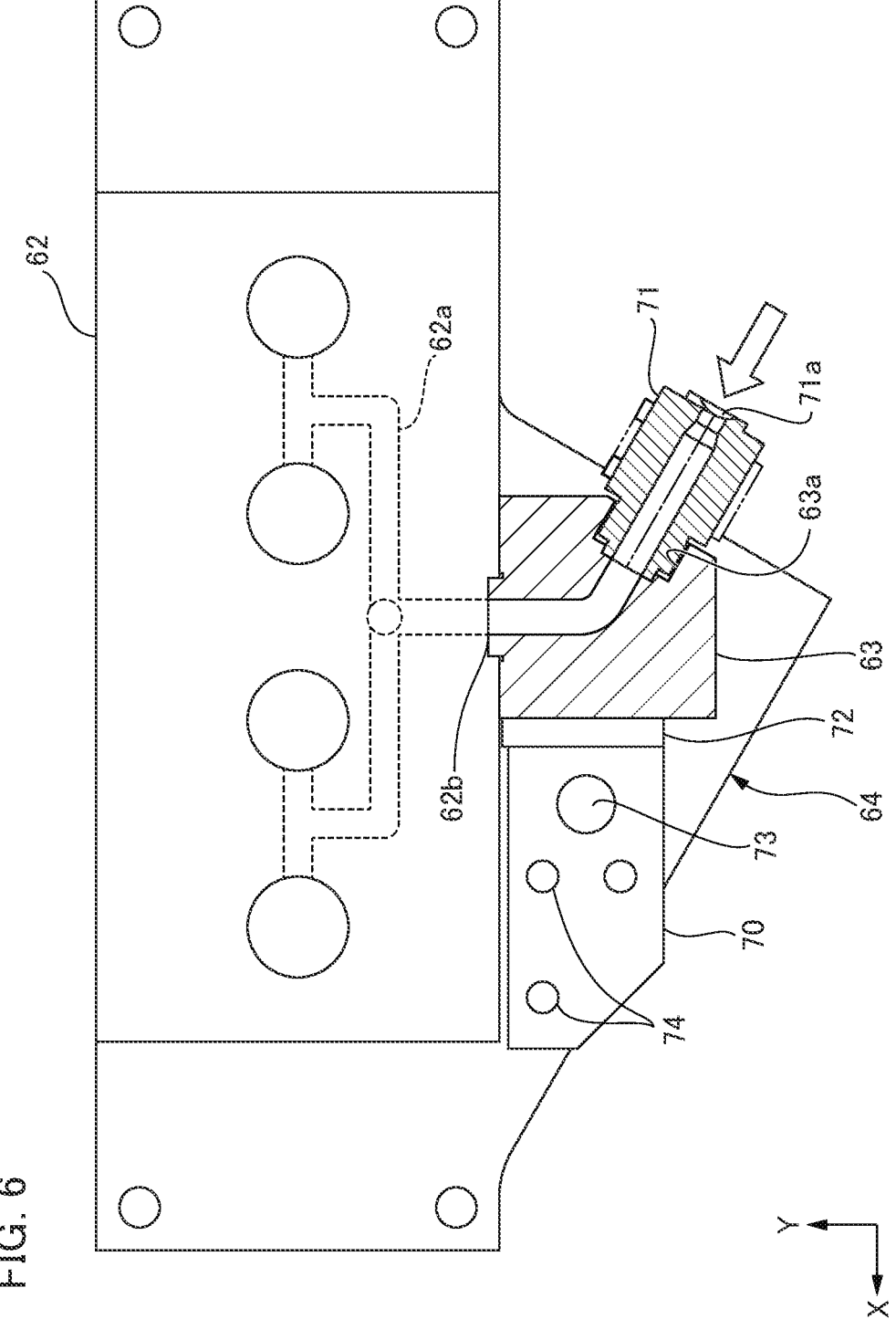
FIG. 6 is a diagram illustrating a further modification example of FIG. 4.
Figure 7:
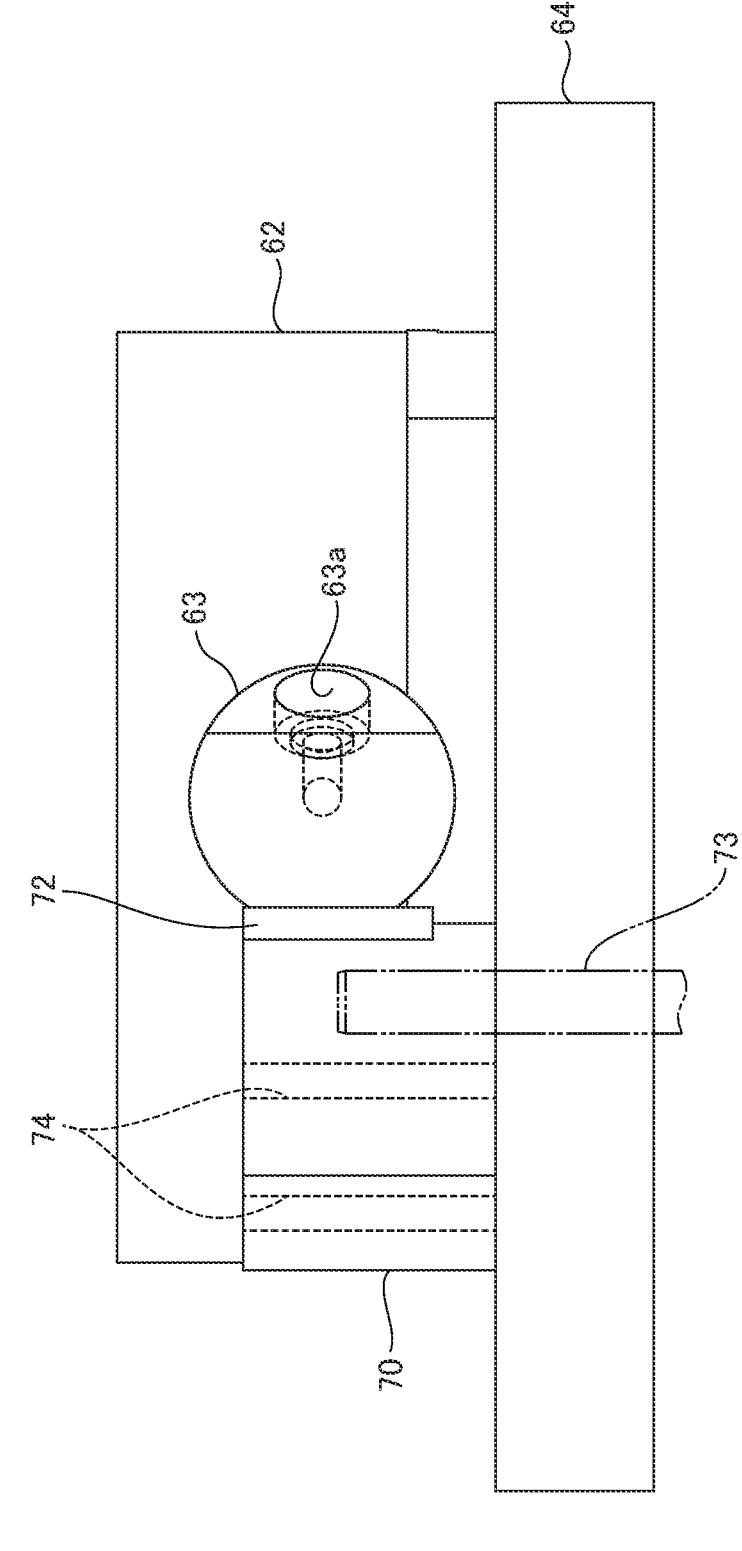
FIG. 7 is a side view of FIG. 6.

FIGS. 6 and 7 are diagrams illustrating a configuration of a further modification example of FIG. 4. In the configuration of FIGS. 6 and 7, a pressure receiving block 70 that receives the load of the relay portion 63 exerted by a nozzle touch or the like with the injection device 38 (39) is fixed to the hot runner fixing plate 64. In addition, a sprue portion (sprue bush portion) 71 is connected to the relay portion 63. A nozzle receiving portion 71a abutting a nozzle of the injection device 38 (39) is formed at a distal end of the sprue portion 71.

As illustrated in FIG. 6, the fitting surface between the resin inlet 63a of the relay portion 63 (relay block) and the sprue portion 71 is disposed to be inclined obliquely with respect to the resin inlet 62b of the hot runner body portion 62 in planar view. The pressure receiving block 70 is disposed on a side surface of the relay portion 63 located on a side opposite to the resin inlet 63a of the relay portion 63. A heat insulating plate 72 is disposed between the side surface portion of the relay portion 63 and the pressure receiving block 70.

As illustrated in FIG. 7, a positioning pin 73 that penetrates the hot runner fixing plate 64 and is supported by the lower base (not illustrated) is inserted below the pressure receiving block 70. This positioning pin 73 positions the pressure receiving block 70 on the hot runner fixing plate 64. In addition, the pressure receiving block 70 is fixed to the hot runner fixing plate 64 via bolts (not illustrated) inserted into bolt holes 74 from above. The pressure receiving block 70 is fixed to the hot runner fixing plate 64 in a state where a predetermined gap is formed with respect to the hot runner body portion 62 and in a state of not being in contact with the hot runner body portion 62. The relay portion 63 is, for example, a member having a substantially columnar shape including a first cutout portion and a second cutout portion. The first cutout portion is formed by obliquely cutting a side surface from an end surface (circular surface) of the cylindrical member on a side not in contact with the hot runner body portion 62. The second cutout portion is formed by cutting a side surface of the columnar member. The sprue portion 69 (second mouthpiece portion 65) is connected to the first cutout portion, and the pressure receiving block 70 is connected to the second cutout portion via the heat insulating plate 72.

The relay portion 63 has the resin inlet 63*a* on the fitting surface with the sprue portion 71. As indicated by an arrow in FIG. 6, the relay portion 63 receives a force generated in the sprue portion 71 due to injection of the molten resin, holding of the nozzle of the injection device, or the like on the fitting surface with the sprue portion 71. Since the fitting surface of the relay portion 63 with the sprue portion 71 is inclined with respect to the resin inlet 62*b* of the hot runner body portion 62, the force generated in the sprue portion 71 or the relay portion 63 is obtained by combining a first component force acting in the depth direction (Y direction in the drawing) of the hot runner body portion 62 and a second component force acting in the width direction (X direction in the drawing) of the hot runner body portion 62.

The relay portion 63 presses the heat insulating plate 72 and the pressure receiving block 70 in the X direction in the drawing by the second component force. Meanwhile, a reaction force from the pressure receiving block 70 fixed to the hot runner fixing plate 64 acts on the relay portion 63 supported (or abutted) by the pressure receiving block 70. Therefore, in the configuration of FIGS. 6 and 7, the second component force acting in the X direction in the drawing among the force generated in the nozzle is received by the pressure receiving block 70, and thus the misalignment between the relay portion 63 and the sprue portion 71 is suppressed, and the connection state thereof can be appropriately maintained. That is, the pressure receiving block 70 functions as a regulating portion that regulates inappropriate movement of the relay portion 63 or the nozzle receiving portion 71*a*.

In addition, also according to the configuration of FIGS. 6 and 7, an excessive nozzle touch force is not required for suppressing resin leakage. Therefore, when the hot runner mold and the injection cavity mold are pressed by the injection device, inclination or misalignment with respect to the lower base is suppressed, and uneven thickness of the preform is less likely to occur.

Furthermore, in the configuration of FIGS. 6 and 7, the number of connected components around the nozzle can be reduced as compared with the configuration of FIG. 4, and the machining accuracy of each component does not need to be increased, and thus the manufacturing cost can be suppressed.

Here, in the manufacture of the delamination container, the first layer 11 of the preform 10 is molded by the first injection molding unit 31 (first injection molding step).

Thereafter, the first layer 11 of the preform 10 is subjected to temperature adjustment (first temperature adjustment step) by the first temperature adjustment unit 32 by the movement of the rotating plate 37*a*, and is then sequentially conveyed to the second injection molding unit 33. To be noted, the first temperature adjustment step in the first temperature adjustment unit 32 may be omitted. In the second injection molding unit 33, the second layer 12 is formed on the inner peripheral side of the first layer 11 of the preform 10 (second injection molding step). Thereafter, the preform 10 is subjected to temperature adjustment by the second temperature adjustment unit 34 (second temperature adjustment step), and is then shaped into a delamination container by stretch blow in the blow molding unit 35 (blow molding step). Then, the shaped delamination container is taken out by the taking-out unit 36 (taking-out step). Thereafter, by rotating the rotating plate 37*a* of the conveyance mechanism 37 by a predetermined angle, the respective steps described above are repeated. To be noted, during the operation of the blow molding apparatus 30, six sets of the delamination containers are manufactured in parallel at a time difference of one step each.

The present invention is not limited to the above embodiment, and various improvements and design changes may be made without departing from the gist of the present invention.

In the above embodiment, an example of a mold of an injection molding unit in a manufacturing apparatus for a delamination container has been described. However, the present invention is not limited to the injection molding unit of the manufacturing apparatus for a delamination container, and can be widely applied to a case where a nozzle of an injection device is disposed to be inclined from a position orthogonal to a resin inlet of a hot runner mold.

In the above embodiment, the blow molding apparatus 30 for molding the two-layer preform for manufacturing the delamination container has been described. However, the configuration of the blow molding apparatus of the present invention is not limited to the manufacture of the delamination container, and can be widely applied to a blow molding apparatus having two injection molding units. For example, the configuration of the blow molding apparatus of the present invention can also be applied to manufacture of a decorative container obtained by shaping a multilayer preform of different colors, manufacture of a resin container having a two-layer structure using recycled plastic as an outer layer, and the like.

In addition, the embodiment disclosed herein should be considered in all respects as illustrative and not restrictive. The scope of the present invention is indicated not by the above description but by the claims, and it is intended that meanings equivalent to the claims and all modifications within the scope are included.

The invention claimed is:

1. A hot runner mold comprising:
   a hot runner mold body portion that is fixed to a fixing plate and supplies a molten resin received from a resin inlet to an injection mold;
   a nozzle receiving portion that is disposed to be inclined with respect to a position orthogonal to the resin inlet of the hot runner mold body portion and is coaxially connected to a nozzle of an injection device that supplies the molten resin;
   a relay portion that has a first portion facing the nozzle receiving portion, a second portion positioned on an opposite side to the first portion, and a resin flow path having a bent portion therein and guides the molten resin from the nozzle receiving portion to the resin inlet; and a regulating portion that is fixed to the fixing plate and regulates movement of the nozzle receiving portion or the relay portion with respect to the hot runner mold body portion, wherein the regulating portion supports the second portion of the relay portion at a distance from the hot runner mold body portion in the direction of the extension of the resin inlet, and receives part of a force that the relay portion receives from the nozzle; and the fixing plate is located below the hot runner mold body portion and the regulating portion and extends in a plane perpendicular to the surface of the hot runner mold body where the resin inlet is formed.

2. The hot runner mold according to claim 1, wherein the nozzle receiving portion includes a first member that abuts the nozzle, and a second member that is connected to the first member and inserted into the relay portion, and the first member is loosely fitted to the regulating portion and allows inclination of the first member and the second member in an axial direction caused by thermal expansion of the hot runner mold body portion.

3. The hot runner mold according to claim 1, wherein the hot runner body portion is directly connected to the relay portion.

4. A manufacturing apparatus for a resin container, the manufacturing apparatus comprising:

an injection molding unit including the hot runner mold according to claim 1 and configured to injection-mold a preform having a bottomed cylindrical shape; and a blow molding unit configured to blow-mold the preform having residual heat from injection molding and obtained by the injection molding unit, to manufacture the resin container.

5. The manufacturing apparatus for a resin container according to claim 4, the manufacturing apparatus comprising a plurality of the injection molding units, wherein the blow molding unit blow-molds a multilayer preform laminated by a plurality of times of injection molding.

* * * * *